March 23, 1954
H. WEINMAN
2,673,063
METHOD AND DEVICE FOR PULLING ELECTRODES
Filed Dec. 6, 1949
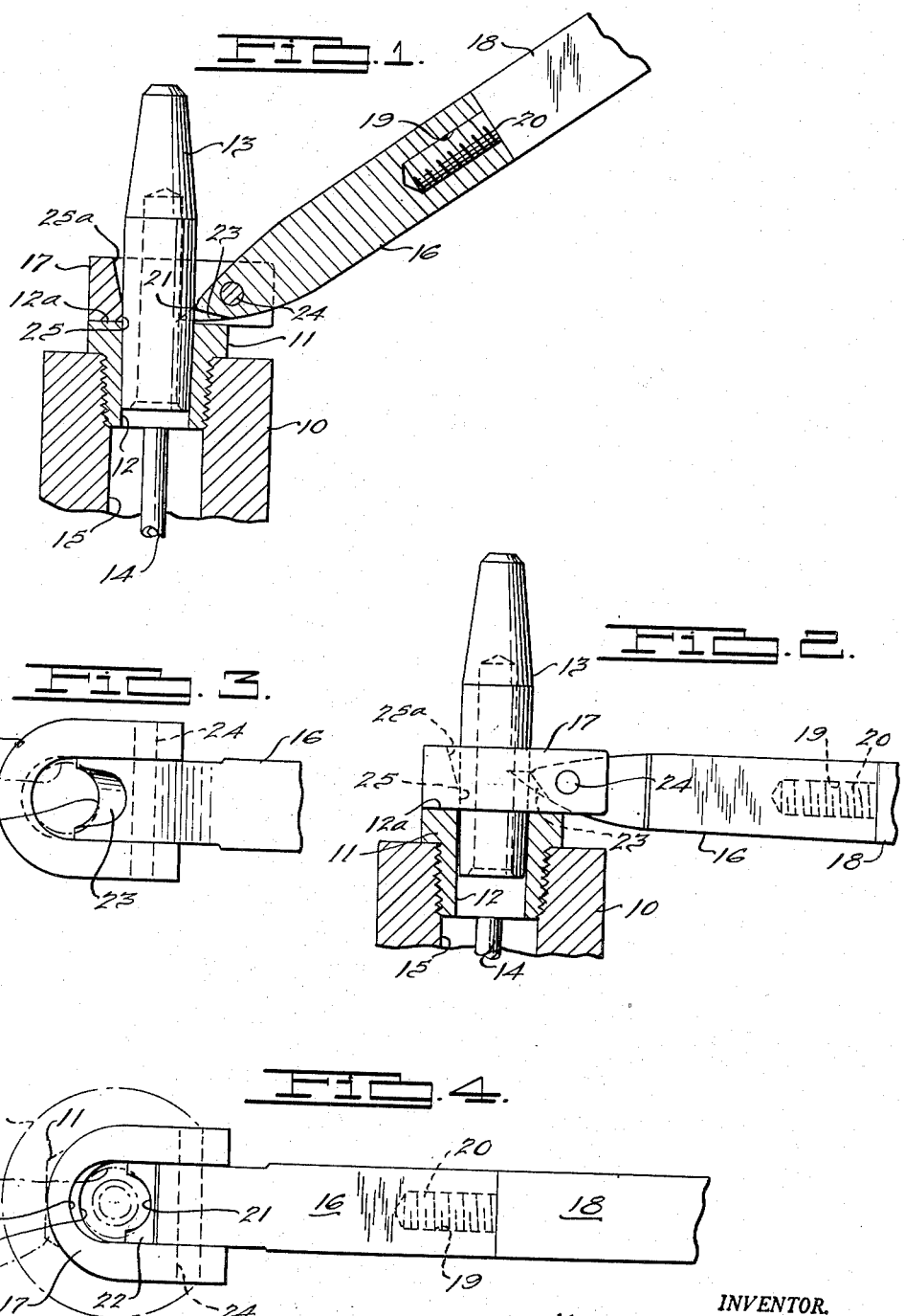
INVENTOR.
Harry Weinman.
BY
Jay C Taylor
ATTORNEY.

Patented Mar. 23, 1954

2,673,063

UNITED STATES PATENT OFFICE 2,673,063

METHOD AND DEVICE FOR PULLING ELECTRODES

Harry Weinman, Detroit, Mich.

Application December 6, 1949, Serial No. 131,306

7 Claims. (Cl. 254—22)

The present invention relates to a pry type electrode puller which is adapted for removing a welding electrode from a tapered seat in a spot welding machine.

In conventional spot welding practice, a hollow water cooled welding tip or electrode is frequently employed having a tapered stem adapted to fit snugly in a correspondingly tapered seat provided in an electrode holder. In order to prevent undesirable leakage of cooling water circulating within the hollow interior of the electrode and to assure optimum electrical contact between the holder and electrode whereby the latter is energized, it is of course important that the juxtaposed tapered portions of the electrode and the seat therefor comprise smooth closely fitting mating surfaces. Accordingly, once the electrode is firmly wedged into the seat of the holder, difficulty is experienced in separating the electrode from the holder without damaging either member or scoring or warping their mating tapered surfaces. During an ordinary spot welding operation, two electrodes are forceably brought together in pairs against the work to be welded therebetween and are thus driven forcefully into their tapered seats in the holders, rendering removal of the worn electrode extremely difficult after usage.

After an electrode is partially worn to the extent that it is no longer serviceable for a particular operation, it is frequently desirable to transfer the partially worn electrode to another machine where further use of the electrode is feasible. Prior to the present invention, it has commonly been the practice in removing such electrodes to twist the same with a pipe wrench or similar tool. Inasmuch as both the electrode and holder are usually formed from copper to assure good electrical conductivity and are accordingly comparatively soft, such treatment often scores or warps the mating tapered surfaces or causes a break in the wall of the hollow electrode. As a result, the partially worn electrode cannot be used in other operations and the scored seat must be replaced, adding appreciably to operating costs.

The paired electrodes or welding tips are generally spaced relatively close together even in the open or inoperative position of the welding machine. An electrode puller has thus been sought which could quickly and easily be applied to one of the electrodes without being obstructed by the other. Preferably such a tool will operate to pull the electrode from its seat in substantially a straight line so that twisting and consequent distortion of the electrode or seat is avoided.

Therefore, it is a primary object of the present invention to provide an efficient welding electrode puller which can quickly and easily be applied in a small working space, and which will operate to extract an electrode in a substantially straight line without twisting the latter or scoring or warping the mating tapered surfaces of the electrode and seat in the holder.

Another object of the present invention is to provide a welding electrode puller having a curved gripping or prying portion adapted to conform substantially to an arc on the circumference of the electrode to be extracted, thus utilizing a maximum area of the gripping portions and preventing breakthrough of the electrode sidewalls during an extraction operation.

A further object of the present invention is to provide an improved method and device for pulling welding electrodes, whereby the electrode is pried from its seat by a pivotal motion of a curved gripping or prying portion and may then be easily removed from the puller.

Another object is to provide an improved simple, efficient and economically employed method and device for pulling welding electrodes, which may be readily employed with a minimum of skill or training on the part of the operator.

Another and more specific object is to provide an improved electrode puller of the foregoing character comprising a pry and a guide member adapted to engage an electrode therebetween in a prying action. The guide is constructed to abut the electrode holder solidly adjacent the electrode during a prying operation so as to transmit the prying force directly to the holder. The pry is fulcrumed on the guide for swinging into prying engagement with the electrode to slide the latter along the guide in the direction of the longitudinal axis of the electrode. Thus the guide serves to counterbalance the force of the pry directed transversely against the electrode so that the latter is loosened from its seat in the holder by axial movement without cocking or twisting.

In a preferred construction, the pry comprises a lever of convenient length having a prying head approximately the width of the electrode to be pulled. The guide member is U-shaped, having paired arms extending from a common base and spaced by the head to which they are pivotally connected in a manner to permit the electrode to be freely inserted between said base and prying end for an extraction operation.

Also in a preferred construction, the inner surface of the base of the U-shaped guide is shaped to conform to the sidewall of the electrode and comprises a smooth surface to facilitate sliding of the electrode thereon during the prying operation. For use with hollow electrodes, the prying end preferably comprises a sharp edge conforming substantially to the sidewall of the electrode, but having lateral portions adapted generally tangentially into the electrode in a prying operation before the central portion of the prying edge engages the electrode. Thus optimum prying engagement with the electrode is assured with minimum danger of piercing the electrode sidewalls by radial penetration by the prying edge.

Extending handleward from the prying edge is a channel or groove provided in the portion of the head which finally confronts the electrode upon completion of a prying operation and shaped to conform substantially to the sidewall of the electrode. Thus removal of the latter from between the head and guide is facilitated after the electrode is loosened from its holder.

Other objects of this invention will appear in the following description and appended claims, reference being had to the accompanying drawings forming a part of this specification wherein like reference characters designate corresponding parts in the several views.

In the drawings:

Fig. 1 is a fragmentary side elevation partially in vertical mid-section, illustrating an electrode seated in its holder and operatively engaged by an electrode puller embodying the present invention, the puller being shown in the initial operating position as it is placed over the electrode.

Fig. 2 is a view similar to Fig. 1, but showing the various parts in their respective positions when the electrode puller has been operated to loosen the electrode from its seated position in the holder.

Fig. 3 is a bottom view of the electrode puller shown in Fig. 2, the loosened electrode being shown in phantom.

Fig. 4 is a plan view of the electrode puller shown in Fig. 2, the electrode and welding apparatus being shown in phantom.

It is to be understood that the invention is not limited in its application to the details of construction and arrangement of parts illustrated in the accompanying drawings, since it is capable of other embodiments and of being practiced or carried out in various ways. Also it is to be understood that the phraseology or terminology employed herein is for the purpose of description and not of limitation.

Referring to the drawings, 10 designates a hollow electrode holder of a conventional spot welding machine. Detachably screw-threaded to the holder 10 is an annular adapter 11 having a downwardly tapered inner electrode seating surface 12 and a flat annular upper surface 12a in accordance with usual construction. A hollow generally cylindrical welding electrode 13 is disposed in the adapter 11, the lower portion of the electrode 13 being tapered to match the taper on the inner surface 12 of the adapter 11. An inlet tube 14 extending upward through the holder 10 terminates below the adapter 11 coaxially therewith for the purpose of directing a jet of water or other fluid coolant into the interior of the electrode 13 to prevent overheating thereof. After the coolant has passed into the electrode 13 and has absorbed heat therefrom, it is returned through the hollow interior 15 of the holder 10 to a drain or cooling tank (not shown). The structure thus far described is conventional and is accordingly not discussed in detail herein except as it is concerned with the operation of the present invention embodied in the electrode puller described below.

The electrode puller consists of a prying head 16, a U-shaped guide member 17 having flat top and bottom portions, and a detachable handle 18. The head 16 in the present instance is provided at one end with a screw threaded opening 19 which accommodates a screw threaded stud 20 of the handle 18, permitting the latter to be readily fitted to prying heads of different sizes. Although the handle 18 may be of any convenient length, an overall length of approximately eighteen inches for the tool has proved satisfactory in tests conducted using the electrode puller with different welding machines and electrodes of various sizes.

The forward portion of the head 16 opposite the opening 19 has a transverse width approximately equal to the diameter of the electrode 13 and has inwardly curved top and bottom portions which terminate in a sharp transverse prying edge 21 curved to conform substantially to the outer untapered cylindrical sidewall of the electrode 13, Figs. 3 and 4. The top forward portion of the head 16 adjacent the curved prying edge 21 is formed to provide a flat ledge or prying shoulder 22, Fig. 4, which extends forward substantially in the plane of the transverse and longitudinal axes of the head 16 to meet the upwardly curved bottom of the forward end of the head 16 along the edge 21. The ledge 22 serves as a flat shoulder or abutment adapted to pry upward against the material of the electrode 13 when the edge 21 is embedded thereinto during operation as discussed below. As indicated in Fig. 4, the edge 21 is curved so that the lateral portions thereof will cut generally tangentially into the adjacent sides of the electrode during operation. In consequence a maximum area of the shoulder 22 will underlie the material of the electrode sidewall for upward prying thereon with a maximum of radial penetration thereof.

Extending handleward and downward from the edge 21 is a cylindrical groove or channel 23 formed symmetrically with respect to the vertical median plane of the head 16 in the upwardly curved forward bottom portion thereof, Fig. 3. Since in the present instance the cylindrical surface of the groove 23 intersects the plane ledge or surface 22 to form the curved prying edge 21, the radius of curvature of the groove 23 is only slightly less than the cylindrical radius of the electrode 13, so that the groove 23 conforms substantially to the cylindrical contour of the electrode 13 and facilitates removal of the latter from the tool upon completion of an extraction operation as explained below.

The arms of the U-shaped guide 17 are spaced by the forward portion of the head 16 and are pivotally connected thereto by a transverse pin 24 extending through the head 16 at a location spaced rearward of the central portion of the edge 21 a short distance approximating the cylindrical radius of the electrode 13 for which the tool is adapted. The approximate lower third of the inner curvature of the U-shaped guide 17 confronting the edge 21 comprises a smooth cylindrical guide surface 25 conforming substantially to the curvature of the electrode 13 and serving as a slideway therefor during an extraction operation. In the horizontal position of the guide 17, the cylindrical surface 25 extends vertically parallel to the longitudinal axis of the electrode 13 and is spaced sufficiently from the edge 21 to permit free passage of the electrode 13 between the edge 21 and surface 25 when the longitudinal axis of the head 16 is inclined approximately 45° to the surface 25 as shown in Fig. 1. In this position, the flat bottom surface of guide 17 may be placed solidly on the flat upper surface of the adapter 11 around the seated electrode 13 with the latter projecting upward between the cylindrical surface 25 and curved edge 21. Above the cylindrical surface 25, the inner curvature of the guide 17 inclines outward at 25a in order to facilitate removal of the electrode from the tool after the electrode is loosened from its seat 12.

It is apparent from the foregoing that as the handle 18 is swung downward in a prying action about the pivot 24, the edge 21 will swing upward and forward against the adjacent side of the electrode 13, drawing the guide surface 25 firmly against the electrode in opposition to the horizontal thrust of the edge 21. The guide 17 and head 16 are preferably dimensioned so that the lateral portions of the edge 21 will first engage the electrode in a prying action at a level approximately opposite the lowermost level of the surface 25 while the handle 18 is still appreciably inclined to the horizontal, as indicated in Fig. 1. Upon continued downward swinging of the handle 18, the edge 21 will be forced forward against the sidewall of the electrode 13 and embedded therein. Simultaneously of course the vertical edge 25 of the yoke 17 will be drawn against the electrode sidewall with an oppositely directed force of exactly equal magnitude, which counterbalances the forward thrust of the edge 21 and prevents cocking or warping of the electrode. As the edge 21 digs into the electrode 13, it also swings upward, lifting the electrode on the ledge or shoulder 22, Fig. 2, and causing the electrode to slide vertically upward along the guide surface 25.

It is also to be observed from Fig. 1 that the curved forward bottom portion of the head 16 does not rest upon the top surface of the adapter 11 even at the start of the prying operation. As the latter proceeds, the aforesaid forward bottom edge is raised still further from the adapter 11, Fig. 2. Thus the entire downward force exerted on the adapter 11 during upward prying or extraction of the electrode is applied through the body of the guide 17. Since the latter rests solidly and flatly on the adapter 11 throughout the extraction operation, no force is applied tending to twist or cock the electrode and the latter is lifted directly axially from its seat 12.

After the electrode 13 is loosened in the seat 12, the handle 18 moving downward past the horizontal swings the prying edge 21 upward out of engagement with the electrode 13, moving the groove 23 into a loose contact with the electrode 13. It is to be noted in this connection that as the edge 21 digs into the electrode sidewall, a radially extending flare or burr will be formed on the electrode adjacent the region of penetration. This burr will of course not interfere with subsequent use of the electrode 13 since it is above the seat 12, although it sometimes interferes with removal of the electrode from the tool. In order to minimize this difficulty, the groove 23 in combination with the inclined surface 25a of the guide 17 permits the loosened electrode to be tilted away from the edge 21 and slid either upward or downward from the tool in a direction generally parallel to the incline 25a. Thus stubborn lodging of the electrode between the head 16 and yoke 17 is prevented.

By the foregoing a simple and efficient welding electrode puller has been disclosed which may be employed substantially as described with electrodes disposed at any operating position, as for example either horizontal or inverted. By virtue of the handle 18 prying from the side of the electrode, the tool may be employed where only a slight separation is afforded between opposing electrodes. Also by use of the present invention, partially worn electrodes may be removed without damage and used again in different operations, effecting appreciable savings in welding costs.

Previous methods of removing electrodes have not only ruined a great many electrodes, but have scored or distorted the tapered walls of many adapters. Such distortion impairs the electrical contact between the seat 12 and electrode 13 and permits leakage of the coolant even when a new electrode is seated within the distorted seat 12. Thus installation of a new adapter is necessitated.

In the claims:

1. In a tool for prying a welding electrode from its seated engagement with an electrode holder, a support having a guide surface and being adapted to abut the holder with the guide surface engaging the electrode in axially sliding relation, and a lever having a sharp transverse prying edge and being pivoted on the support to swing the prying edge forcefully away from the holder and toward the guide surface, the lateral portions of the prying edge projecting toward the guide surface to cut into the electrode before the central portion of the prying edge engages the electrode in a prying operation.

2. In a tool for prying a cylindrical type welding electrode from its seated engagement with an electrode holder, a guide member having a guide surface and being adapted to abut the holder with the guide surface engaging the electrode in sliding relation, and a swinging lever having a sharp prying edge transversely curved to conform substantially to the surface of the electrode and adapted to embed thereinto during the prying operation, said lever being pivoted to swing the prying edge away from the holder and forcefully toward the guide surface in a prying operation, the portion of the lever confronting the guide surface upon completion of the prying operation being grooved to conform substantially to the contour of the electrode.

3. In a tool for prying a welding electrode from its seated engagement with an electrode holder, a support having a guide surface for the electrode, said support being adapted to seat against the holder with the guide surface engaging one side of the electrode in axially sliding relation during the prying operation, a swinging pry having a sharp prying edge engageable with the electrode to cut thereinto during said prying operation, said pry being pivoted on said support to swing said edge toward the side of said electrode opposite said one side and outward from said holder in said prying operation.

4. In a tool for prying a welding electrode from its seated engagement with an electrode holder, a swinging pry having a sharp prying edge engageable with the electrode to cut thereinto during a prying operation, a support adapted to seat against said holder and having a fulcrum portion on which said pry is pivotal to pry said electrode from the holder, said support also having a smooth guide surface slidably engageable with said electrode in supporting relation in opposition to said pry during the prying operation, said guide surface comprising an inner portion extending axially of said electrode and an outer portion diverging from the axis of the electrode.

5. In a tool for prying a welding electrode from its seated engagement with an electrode holder, a support adapted to seat against the holder during a prying operation, guide means on the support engageable with an axial side of the electrode in supporting relation upon movement of the electrode relative to the support during a prying operation, and a pry pivotally engaged with the support to swing into prying engagement with the electrode in opposition to said guide means, the pry having a sharp transverse prying edge shaped to conform substantially to the engaged surface of the electrode and adapted to embed thereinto during the prying operation.

6. The method of prying a welding electrode from its seated engagement with its holder comprising the steps of applying force to said electrode at one side thereof to grip the latter and continuing the same force to pry the electrode outward from its holder, and simultaneously supporting said electrode in opposition to the gripping and prying force.

7. The method of prying a welding electrode from its seated engagement with its holder comprising the steps of applying force to said electrode at one side thereof to undercut and grip the sidewall of the electrode and continuing the same force to pry the electrode outward from its holder, and simultaneously supporting said electrode in opposition to the gripping and prying force.

HARRY WEINMAN.

References Cited in the file of this patent

UNITED STATES PATENTS

| Number | Name | Date |
|---|---|---|
| 372,274 | Oliver | Oct. 25, 1887 |
| 725,923 | Beeman | Apr. 21, 1903 |
| 2,245,838 | Taylor | June 17, 1941 |